Jan. 7, 1930.                E. F. MAAS                1,743,077
        METHOD AND MACHINE FOR INSERTING AIRBAGS IN TIRE CASINGS
                    Filed Dec. 13, 1924      7 Sheets-Sheet  1

INVENTOR
ELOV F. MAAS
BY
ATTORNEY

Jan. 7, 1930. E. F. MAAS 1,743,077
METHOD AND MACHINE FOR INSERTING AIRBAGS IN TIRE CASINGS
Filed Dec. 13, 1924 7 Sheets-Sheet 2
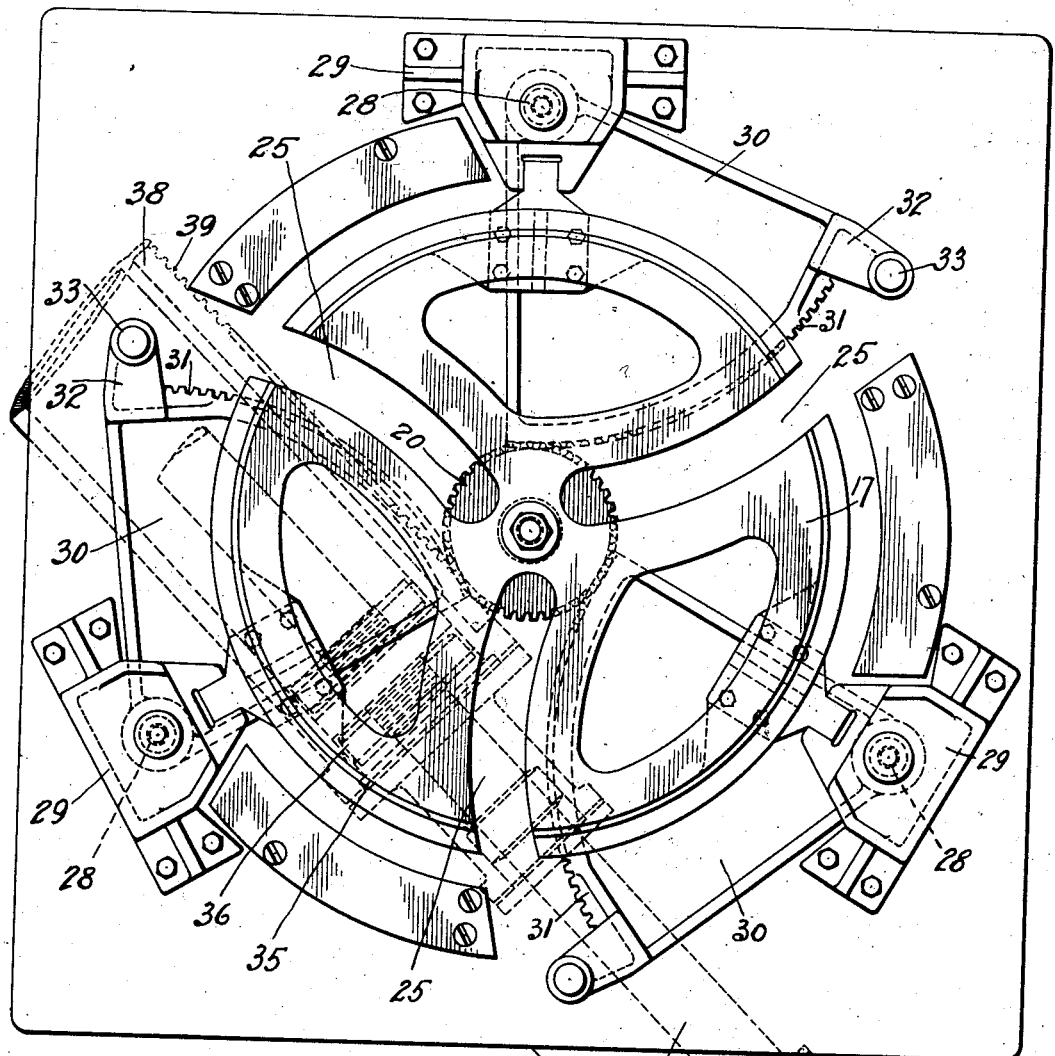
FIG. 2.
INVENTOR
ELOY F. MAAS
BY 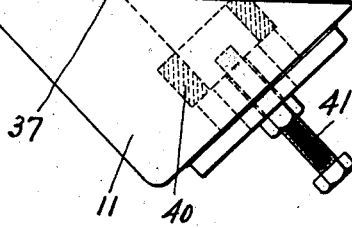

Jan. 7, 1930.  E. F. MAAS  1,743,077
METHOD AND MACHINE FOR INSERTING AIRBAGS IN TIRE CASINGS
Filed Dec. 13, 1924   7 Sheets-Sheet 3

INVENTOR
ELOY F. MAAS
BY

Jan. 7, 1930.  E. F. MAAS  1,743,077
METHOD AND MACHINE FOR INSERTING AIRBAGS IN TIRE CASINGS
Filed Dec. 13, 1924  7 Sheets-Sheet 6

INVENTOR
ELOV F. MAAS
BY
ATTORNEY

Patented Jan. 7, 1930

1,743,077

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

METHOD AND MACHINE FOR INSERTING AIRBAGS IN TIRE CASINGS

Application filed December 13, 1924. Serial No. 755,773.

My invention relates to a method of and machine for inserting flexible pneumatic cores in pneumatic tire casings.

More specifically, my invention relates to a novel method of and machine for contracting pneumatic air cores so as to permit of the ready application thereof to pneumatic tire casings of either the core built or flat built type, preparatory to the vulcanization of such casings.

One object of my invention consists in providing a novel method of inserting air bags into pneumatic tire casings of either the core built or flat built type. Another object of my invention consists in providing a novel type of machine for practicing the method referred to.

In connection with the manufacture of pneumatic tire casings, it is desirable to vulcanize the casings within a closed metallic mold and with an inflated pneumatic core within the casing. In inserting these cores into casings of the core built type, it has been customary to manually buckle or indent the pneumatic core or air bag at one point, and insert as much of the portion of the core remaining arcuate in form as is possible into the tire casing. Subsequently, the remainder or buckled portion thereof is forced into proper position by striking it with a heavy mallet, or the like, in the direction of the casing, so as to restore the bag to an annular form. This method of inserting air bags is particularly undesirable on account of the fact that the relatively heavy bag must be badly buckled so as to form a sharp crease therein each time it is inserted into a tire casing. Furthermore, after the core is inserted in this manner, it is necessary to bounce the casing, with the bag inserted therein, on the floor a number of times in order to insure that the bag is not creased and is properly disposed within the casing. Both of these operations represent, particularly in connection with large-size tires, very strenuous work.

One method of tire building consists in building pneumatic tire casings in the form of a flat endless band. In order to vulcanize a tire of this type, it is necessary to first shape it to the desired arcuate cross-sectional contour, and to subsequently cure it by heating it under pressure within a closed mold.

Heretofore, flat built casings have been shaped by placing them within a partially closed mold, together with a suitable air bag or core, and, by inflating the bag to the proper degree, thereby forcing the casing into substantially the desired configuration. In order to do this, it is necessary either to employ a bag of smaller diameter than the ultimate diameter of the tire casing, in which event the bag is unduly stretched, or to employ a bag of the same diameter as the ultimate diameter of the tire casing, in which event it must be buckled and inserted manually, which results in the placing of greater strains on one portion of the casing and core than on others, owing to the fact that the core cannot be evenly disposed therein.

My present invention, as employed on flat built pneumatic tire casings, is particularly adapted to be practiced in conjunction with an invention disclosed in my co-pending application Serial No. 755,772, filed of even date herewith.

By my invention, I have provided a method of eliminating these difficulties, and also a machine for practicing that method.

For a more thorough understanding of my invention, reference may now be had to the accompanying drawings in which:

Fig. 2 is a plan view of the machine illustrated in Fig. 1;

Figure 7:
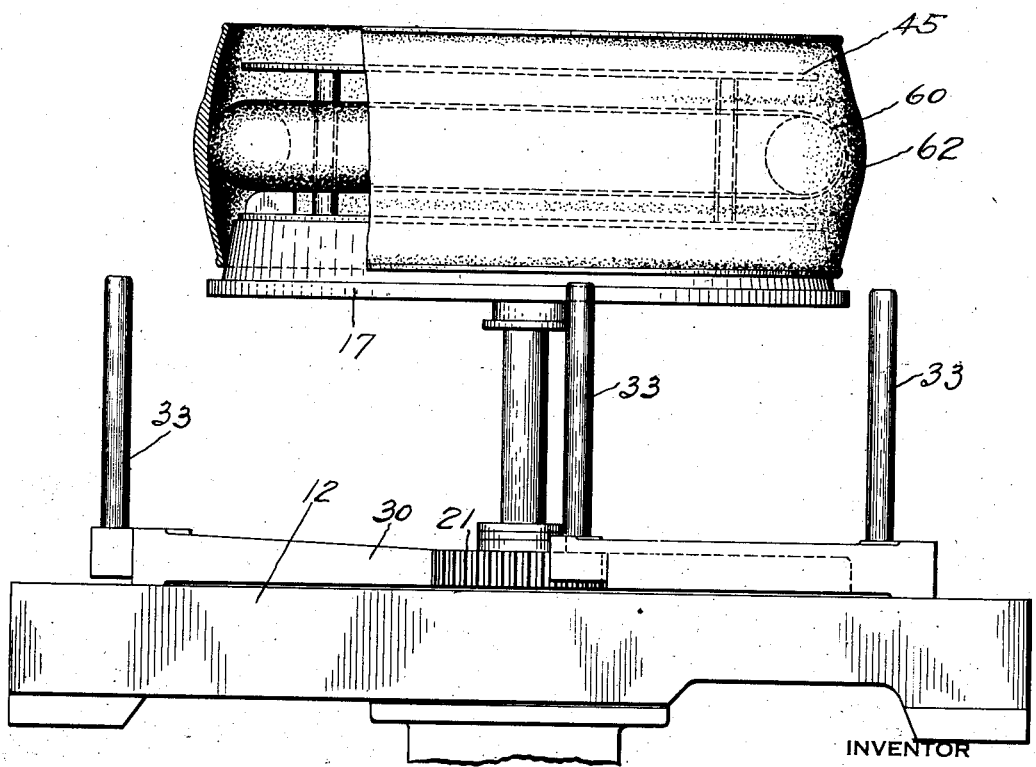
Figure 8:
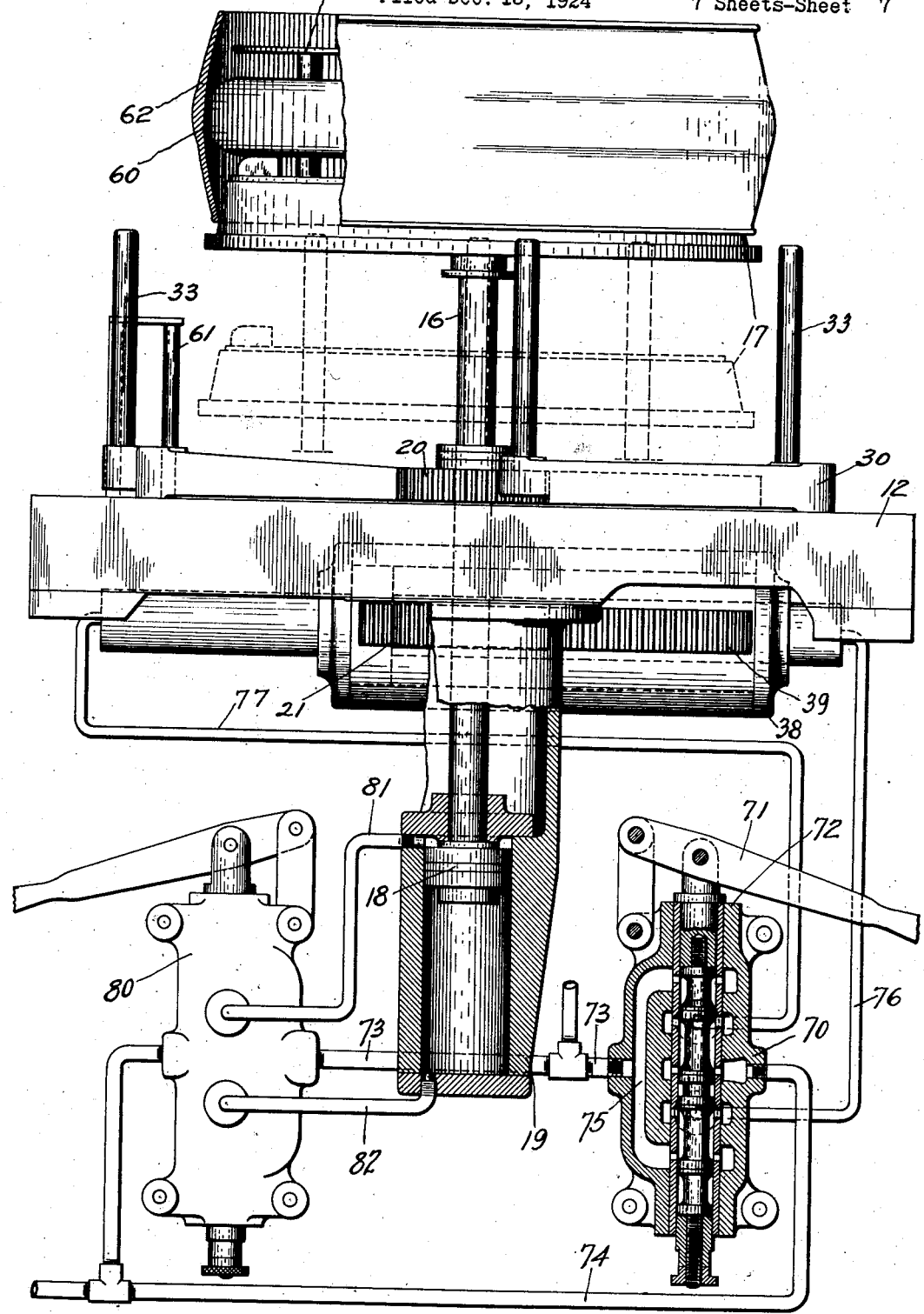

Fig. 7 is a fragmentary side elevational view, with parts broken away for the sake of clearness, of a portion of my machine repsenting the final step of expelling a flat built pneumatic tire casing, with a pneumatic core disposed therein, from my machine; and Fig. 8 is a side view, partially in section and partially in elevation, of a portion of my machine, representing the controlling mechanism thereof.

Referring more particularly to the drawings, I have shown a machine 10 consisting of a supporting standard 11, provided with a stationary upper member or table 12. The table 12 is substantially square in form, and is provided at the center thereof with an opening 13. Disposed within the opening 13 is a bearing sleeve 14 which engages and supports a rotatable sleeve member 15 which, in turn, surrounds a relatively movable shaft 16. Mounted upon the upper end of the shaft 16 and rigidly connected thereto is a substantially annular platform 17. Mounted upon the lower end of the shaft 16 is a piston member 18 which moves within a cylinder 19 for a purpose to be hereinafter disclosed. Rigidly mounted upon the upper end of the sleeve member 15 is a gear wheel 20, and mounted upon the lower end thereof is a rigidly mounted gear wheel 21 of substantially equal diameter.

As best illustrated in Fig. 2, the table or platform 17 is provided with three arcuate substantially radially extending slots 25. The supporting member or table 12 is provided at three equally spaced points thereon with openings 26 within which are disposed bearing sleeves 27, each of which engage and support a stub shaft 28. The upper end of the stub shafts 28 are each journaled in a suitable supporting member 29 which, in turn, is mounted upon the supporting table 12. Mounted upon each of the stub shafts 28 and oscillatable about the axis thereof is a member 30 of substantially sector shape. The side of the member 30 opposite the shaft 28 is arcuate in contour and is provided with an arcuate rack 31 which meshes with the gear 20 mounted on the upper end of the sleeve 15. In one end of the rack 31 and secured thereto is disposed a supporting member 32 upon which a vertically disposed pin 33 is mounted. The sides of the arcuate slots 25 in the member 17 represent arcs drawn from the axes of the several shafts 28, and the pins 33, which are mounted upon the member 30, move centrally within the cooperating slot 25 upon rotation of the pinion 20. In the position illustrated in Fig. 2, the pins 33 are in their uttermost or inactive position, and are caused to move toward the center of the platform 17 by rotation of the gear member 20 in one direction, and caused to return to their original and illustrated position by opposite rotation of the gear member 20.

The gear member 20 is actuated by means of the gear member 21, both of which are mounted upon the sleeve 15. On the lower side of the supporting platform 12, as best illustrated in Fig. 2, is disposed a mechanism 35 by means of which the gear member 21 is rotated. The mechanism 35 consists of a stationary piston member 36 mounted upon a stationary shaft 37 which, in turn, is mounted on the supporting structure 11. Mounted upon the stationary shaft 37 is a cylinder 38, which is provided on one side with a toothed rack 39 which meshes with the pinion 21 to actuate the pinion 20 and the arms 33. The movable cylinder 38 is actuated by the admission of fluid pressure by means of a suitable controlling mechanism so as to move upon the shaft 37. At one end of the shaft 37 is disposed a collar member 40, which limits the movement of the cylinder 38 to any desired position, thus limiting the movement of the arms 33. The position of the collar member 40 on the shaft 37 may be adjusted by means of a suitable adjusting mechanism 41.

Figure 1:
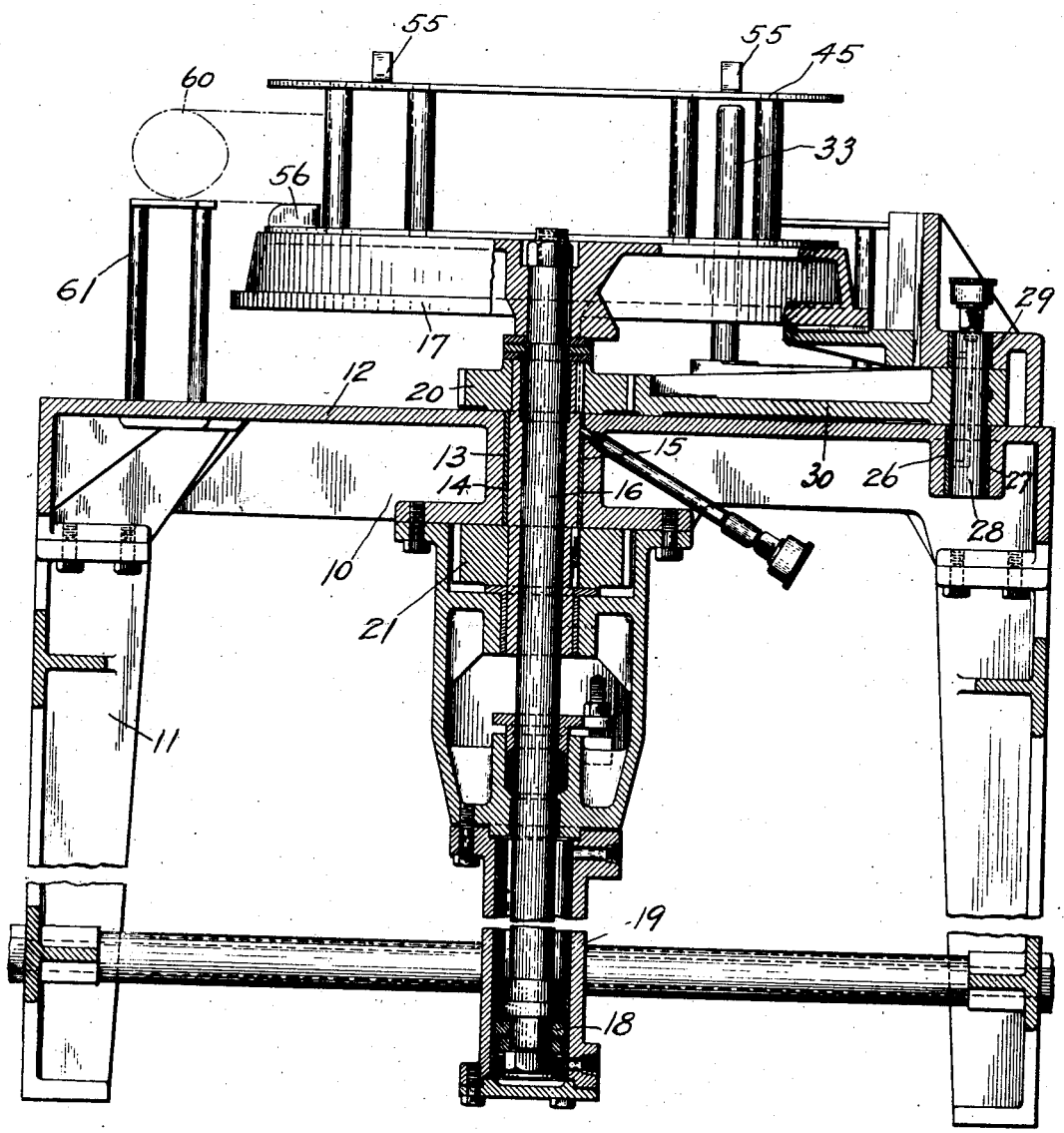
Fig. 1 is a cross-sectional view of a machine embodying my invention.

As best illustrated in Fig. 1, the movable piston member 18 mounted upon the shaft 16 may be actuated by admission of suitable fluid under pressure to the cylinder 19 to raise or lower the shaft 16, thus raising or lowering the supporting member 17 relative to the arms 33.

In conjunction with the machine described, and for use in inserting air bags or cores into flat built casings, I employ a carrier member 45 which consists of an upper or lower platform 46 and 47 respectively. The plate 47 is provided with three equally spaced substantially radially inwardly extending slots 48. Disposed on each side of each of the slots 48 is a rod 49 which extends through and is riveted at one end to the plate 46, and at the other end to the plate 47. Mounted upon each of the rods 49 is a sleeve or roller member 50, for a purpose to be hereinafter described. The plates 46 and 47 are provided with centrally disposed openings 52 and 53 respectively, by means of which the carrier device 45 may be suitably centered when employed on the machine disclosed in my co-pending application previously referred to, but perform no service in connection with the present invention. The plates 46 and 47 are also each provided with three substantially radially inwardly extending slots 54, one purpose of which is to span lugs 56 mounted on the member 17 to insure the proper disposition of the member 45 on the member 17. The plate 46 is also provided with two spaced handles 55 suitably secured thereto, by means of which the member 45 may be carried about.

Although the present invention is described in detail in connection with its application to a flat built pneumatic tire casing, the principle thereof may be equally well employed for inserting air bags in core built pneumatic tire casings, as will be pointed out.

Figure 3:
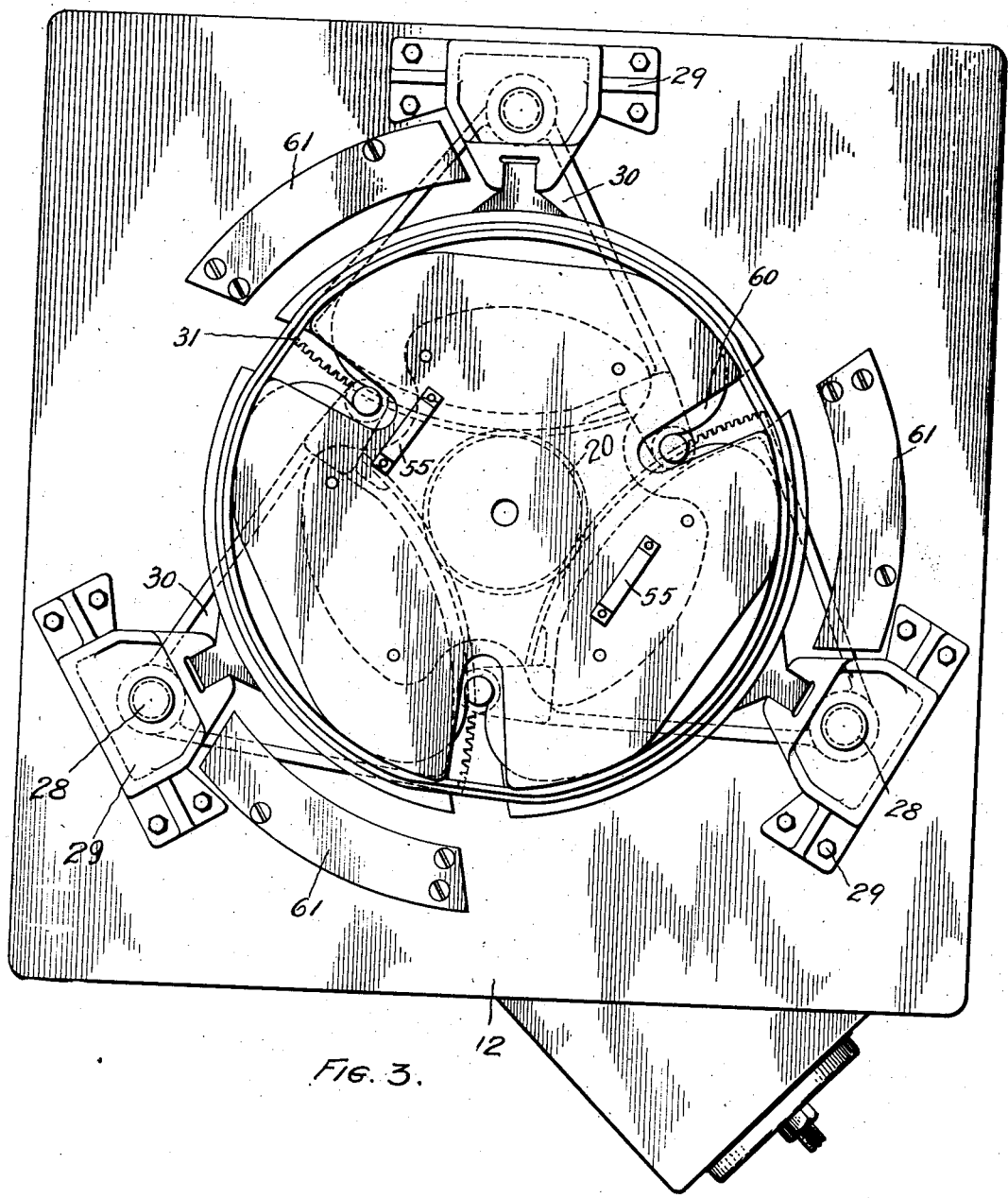
Fig. 3 is a plan view of my machine, illustrating the method of employing it for the purpose of inserting an air bag within a flat built tire casing.
Figure 6:
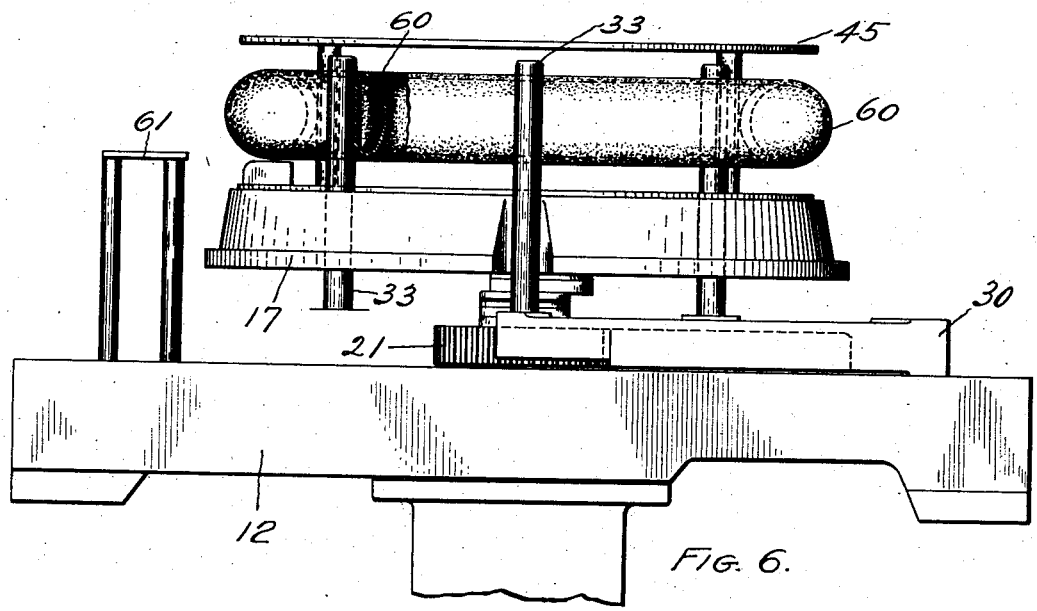
Fig. 6 is a fragmentary view, partially in section and partially in elevation, representing a portion of my machine, illustrating one step of the method of contracting an air bag in order to insert it within a tire casing of either type.

In practicing my invention, the tire supporting member 45 is first placed upon the platform 17, with the lugs 56 projecting into the openings 54, as illustrated in Fig. 1. A substantially annular air bag 60 is then placed upon standards 61, mounted on the supporting platform 12 in such manner as to surround the supporting member 45. In placing the air bag over the member 45, the radially inwardly extending valve stem is passed through one of the slots 54, thus insuring proper disposition of the valve stem when the bag is buckled. The movable cylinder 38 is then actuated so as to cause the rotation of the pinions 21 and 20, thus moving the arcuate members 30, causing the three equally spaced pins 31 to move inwardly in the slots 25 in the platform 17, and in the slots 48 in the carrying member 45. These pins engage the air bag and buckle it at three equi-distant points, as best shown in Figs. 3 and 6. The inward movement pulls portions of the air bag over the rollers 50, which roll with the bag, thus reducing the friction therebetween to a minimum. The diameter of the pins 33 and the rollers 50 are sufficient to prevent the formation of sharp creases in the air bag. The pins move radially inwardly until the cylinder 38 engages the collar member 40, thus limiting their movement. By reason of indenting the air bag 60 at three points, and drawing it over the rollers 50, the over-all diameter thereof is decreased sufficiently to permit of placing thereabout an endless flat built casing 62. The casing 62 rests upon the platform 17 which is of such height with respect to the carrying member 45 that the air bag 60 will be placed directly in the center of the tread portion thereof. The casing is placed over the air bag manually.

Figure 4:
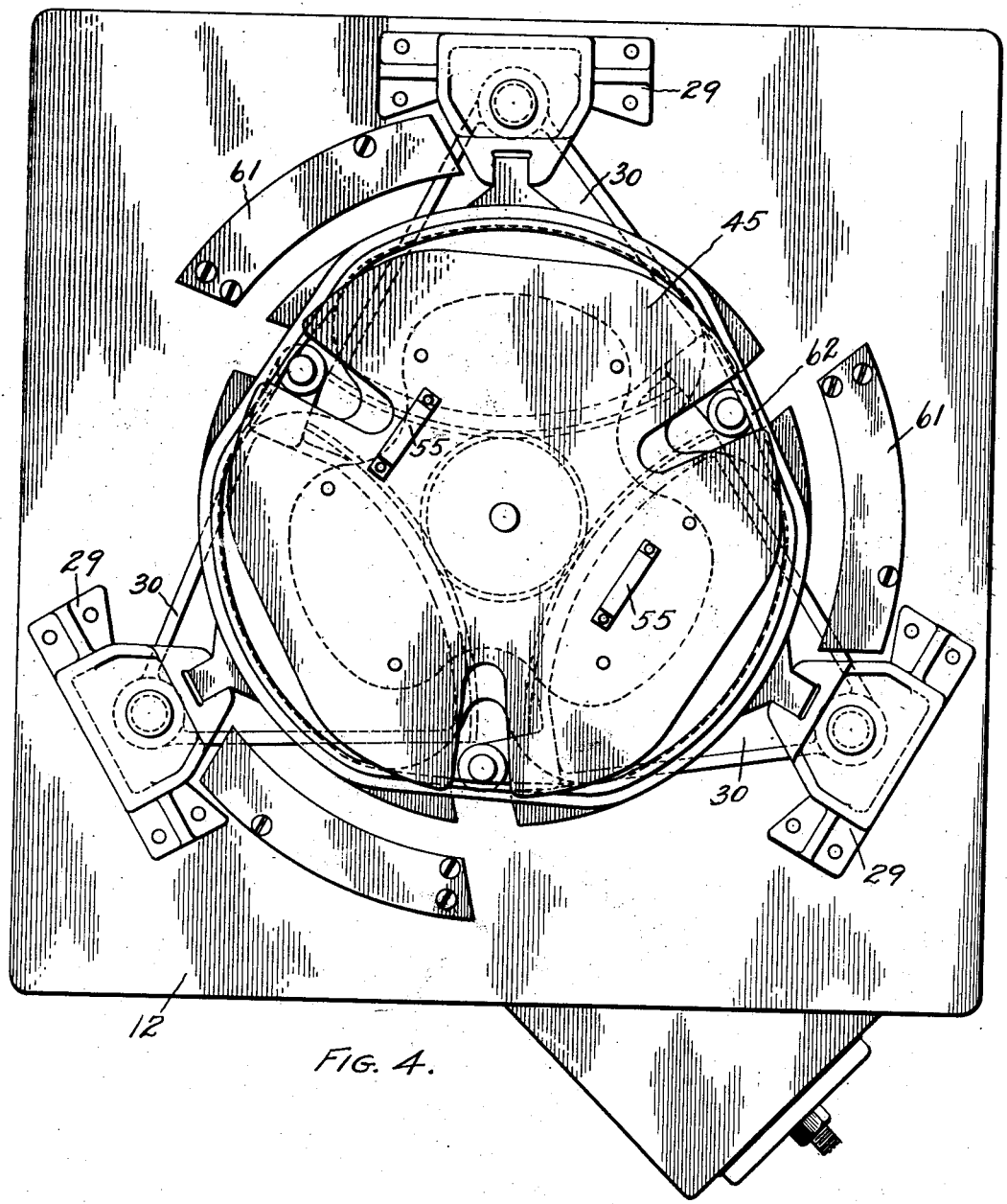
Fig. 4 is a view somewhat similar to Fig. 3, illustrating a second and last step of inserting an air bag into a flat built tire casing.
Figure 5:
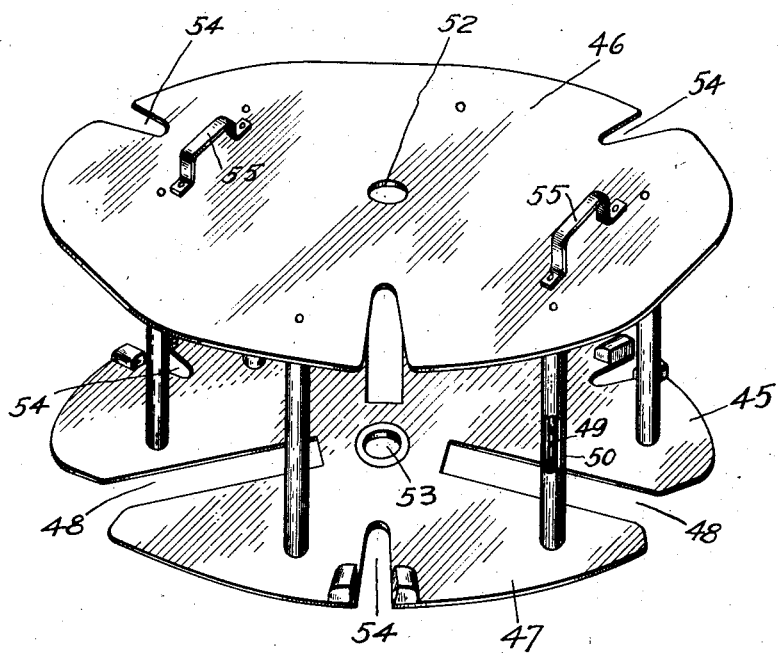
Fig. 5 is a perspective view of a member adapted to support a tire casing and associated air bag, for use in connection with my machine when employed for the purpose of inserting air bags into flat built pneumatic tire casing.

As soon as the casing has been properly positioned over the air bag, the cylinder 38 is energized so as to cause the pins 33 to move outwardly, thus permitting the air bag to tend to straighten out, as best illustrated in Fig. 4, and thereby engage the pneumatic tire casing, causing it to become flattened out, as indicated at 62, at the points at which the air bag is buckled. The cylinder member 18 is then suitably energized to cause the platform 17, together with its supported carrying member 45, to be raised vertically, as illustrated in Figs. 7 and 8, raising it above the tops of the pins 33. As soon as the member 17 has been raised sufficiently, the pins 33 are permitted to resume their outward movement to their original positions. If desired, the cylinder 38 and the piston 18 may be actuated simultaneously to increase the speed of operation of the machine.

After the member 17 has been raised to its uppermost position, the carrying member 45 is grasped by means of the handles 55 and is removed from the platform 17. The diameter of the plates 46 and 47 of the member 45 are of but slightly less diameter than the casing disposed thereabout, and they, together with the roller members 77 have sufficient frictional contact with the air bag 60 to permit of raising the carrying member 45, the air bag 60 and the casing 62 as a unit. The member 45, together with its supported casing and air bag, are then in proper condition to be placed on the machine described in my co-pending application previously referred to.

After the carrying member 45 has been removed from the platform 17, the piston member 18 is suitably energized to cause it to return to its original lower position, so that, with the arms 33 in their outermost position and the member 17 in its lowermost position, the machine is then prepared to repeat the operation described on another air bag and casing.

If desired, the operation of the cylinder 38 may be controlled by means of a suitable fluid valve 70 which is provided at its upper end with an actuating handle 71 which actuates a movable valve member 72. The valve 70 is connected with an inlet pipe 73 and an exhaust pipe 74. In the position indicated in Fig. 8, the actuating fluid enters the valve 70 through the inlet pipe 73 under pressure to a suitable passageway 75, through suitable openings in the valve member 72 to a pipe or connection 76, which permits of the introduction of the fluid to the cylinder 38. The opposite end of the cylinder 38 is connected to a pipe 77 which, in turn, is connected through suitable passageways in the valve member 72 to the exhaust pipe 74. When the handle 71 is moved to its uppermost position, the fluid connections are reversed so that the inlet pipe 73 is connected directly to the pipe 77, and the pipe 76, connected to the opposite end of the cylinder 38, is in open communication with the exhaust pipe 74. By a similar arrangement, a valve 80 is connected to the inlet and the exhaust pipe 73 and 74 respectively, and is connected to the upper end of the cylinder 19 by means of a pipe 81, and to the lower end thereof by means of a pipe 82. The valves 70 and 80 may, of course, be operated either by hand or by foot, or electrically. If desired, they may be so interlocked as to cause simultaneous action thereof under certain desired conditions.

In connection with using my present invention for inserting air bags into core built casings, the carrying member 45 is dispensed with. An air bag 60 is disposed upon a supporting member 61 and the arms or pins 33 are moved inwardly simultaneously, thus buckling the bag at three points. The over-all diameter of the bag is thereby reduced to slightly greater than the over-all diameter of the beads of the core built casing. The beads of the casing are then spread manually, so as to permit of introduction of the three outwardly projecting portions of the air bag thereto, after which the pins 33 are caused to move outwardly, thus permitting the air bag to resume its original annular form. This is accomplished without use of any additional machinery, since the air bag is of such diameter that it will return to its annular form within the casing and fit snugly therein. In connection with the insertion of air bags into core built tire casings, the mechanism 19 adapted for raising or lowering the platform 17 may be employed, if desired, or may be dispensed with as the tire casing with its inserted tube may be lifted directly from the platform 17 without difficulty. It is sometimes desirable, in connection with the insertion of air bags into core built casings, to have the platform 17 disposed in a substantially vertical plane, with the remainder of the operation of the machine substantially identical.

From the foregoing description, it will be apparent that I have provided a machine equally adapted for the insertion of air bags into flat built tire casings and into core built pneumatic tire casings. Also, that by means of this machine, the injury to the bag caused by buckling thereof is materially reduced, as no sharp creases are made therein by reason of the diameter of the pins 33 and the roller members 50; that the amount of labor necessary for inserting such bags into the casing is materially reduced; and that the length of time required for inserting such air bag into a casing is considerably less than when the same operation is performed manually.

Although I have disclosed but a single form of my invention, and have described in detail but two applications thereof, it will be apparent to those skilled in the art that my invention is not so limited but that many modifications and changes may be made therein without departing from the spirit of my invention or from the scope of the appended claims.

What I claim is:

1. In the manufacture of pneumatic tire casings, the method of inserting an annulus therein which comprises indenting the annulus at a plurality of spaced points prior to placing the tire casing thereover.

2. In the manufacture of pneumatic tire casings, the method of inserting an annulus therein which comprises indenting the annulus at a plurality of equally spaced points prior to inserting it within the casing.

3. In the manufacture of pneumatic tire casings, the method of inserting an annular air bag therein which comprises buckling the annulus inwardly at three equidistance points prior to assembling the casing therewith.

4. In the manufacture of pneumatic tire casings, the method of inserting an annulus therein which comprises indenting the annulus at a plurality of points, placing the tire casing thereover, and removing the indentations from the annulus.

5. In the manufacture of pneumatic tire casings, the method of inserting an annulus therein which comprises indenting the annulus at three equidistant points, placing the casing over the distorted annulus, and permitting the annulus to return to its original annular contour.

6. In the manufacture of pneumatic tire casings, the method of inserting a pneumatic core therein which comprises causing a plurality of points on the core to be moved inwardly simultaneously, placing the distorted core within a tire casing, and permitting the core to again assume an annular contour.

7. A machine for facilitating the assemblage of annular pneumatic cores within pneumatic tire casings which comprises means for indenting the cores at a plurality of points.

8. A machine for facilitating the assemblage of annular air bags within pneumatic tire casings which comprises means for indenting the air bags at a plurality of equally spaced points.

9. A machine for assembling annular air bags within pneumatic tire casings which comprises means for indenting the air bags at a plurality of equally spaced points simultaneously.

10. A machine for assembling annular air bags within pneumatic tire casings which comprises means for moving a plurality of equally spaced points on the bags inwardly simultaneously.

11. A machine for assembling annular flexible air bags within pneumatic tire casings comprising a plurality of regularly spaced substantially radially movable arms, and power actuated means for moving said arms inwardly and outwardly.

12. A machine for assembling annular flexible air bags within pneumatic tire casings comprising a plurality of regularly spaced pivotally mounted arms each provided with an arcuate rack member, a centrally mounted pinion in engagement with said rack members, and power actuated means for rotating said pinion in either direction.

13. A machine for assembling annular flexible air bags within pneumatic tire casings comprising a plurality of regularly spaced pivotally mounted arms each provided with an arcuate rack member, a centrally mounted pinion in engagement with said rack members, and power actuated means for rotating said pinion a predetermined number of revolutions in either direction.

14. A machine for assembling annular flexible air-bags within pneumatic tire casings comprising a plurality of regularly spaced pivotally mounted arms each provided with an arcuate rack member, a centrally mounted pinion in engagement with said rack members, and fluid operated cooperating piston and cylinder provided with a rack disposed in engagement with said pinion to operate the same.

15. A machine for assembling annular flexible air bags within pneumatic tire casings comprising a plurality of regularly spaced pivotally mounted arms each provided with an arcuate rack member, a centrally mounted pinion in engagement with said rack members, a fluid operated cooperating piston and cylinder provided with a rack disposed in engagement with said pinion to operate the same, and means for limitng the movement of said rack to a predetermined degree.

16. A machine for assembling annular flexible air bags within pneumatic tire casings comprising a plurality of regularly spaced pivotally mounted arms each provided with an arcuate rack member, a centrally mounted pinion in engagement with said rack members, a stationary piston member, and a relatively movable cylinder adapted to cooperate therewith and provided with a rack member mounted thereon, said rack member being disposed in engagement with said pinion and adapted to operate the same.

17. A machine for assembling annular flexible air bags within pneumatic tire casings comprising means for disposing the bag within the casing, and means for removing the bag and the casing from the machine.

18. A machine for assembling annular flexible air bags within pneumatic tire casings comprising means for buckling the bag so as to reduce its diameter, means for centering the bag with respect to the casing, and power actuated means for forcing the casing and bag from the machine as a unit.

19. A machine for assembling annular flexible air bags within pneumatic tire casings comprising a plurality of symmetrically disposed arms adapted to move inwardly simultaneously to buckle the bag, a member disposed adjacent said arms and adapted to support the tire casing, power actuated means for causing said arms to move inwardly or outwardly, and power actuated means for moving said casing support so as to remove the bag from the arms and release the casing and the bag from the machine as a unit.

20. In a machine for inserting air bags into pneumatic tire casings, a bag support comprising two substantially circular plates disposed in spaced relatively stationary positions, said plates being provided with a plurality of spaced aligned substantially radially extending slots, and roller members extending between said plates and disposed on each side of said slots adjacent the periphery of said plates.

21. Apparatus comprising, in combination, means for collapsing a pressure bag, and means for supporting a tire to receive the collapsed bag.

22. Apparatus of the class described comprising means for collapsing a pressure bag, and means thereon for supporting a tire to receive the collapsed bag.

23. A device of the character described comprising a support for a bag, means to fold a portion of the bag inwardly with respect to its normal perimeter and means to position a tire casing relative to the so-folded bag.

24. Apparatus of the class described comprising a plurality of active presser elements, and means for operating the elements to collapse a pressure bag held thereby.

25. Apparatus comprising means for supporting a pressure bag, means for supporting a tire with one portion below the first supporting means, and means for collapsing the bag on the first supporting means.

26. A device of the class described comprising means for supporting a bag and means for folding a portion of the bag inwardly in the plane of the bag preparatory to the insertion of said bag in a tire casing.

27. A device of the class described comprising means for engaging a bag at the part to be folded, and means for moving said engaging means in a direction to move the engaged part in the original plane of the bag toward the part opposite thereof.

28. A device of the class described comprising means for supporting a bag and means for engaging a portion of the outer periphery of the bag to fold said portion inwardly into the plane of the bag preparatory to inserting the bag in folded condition in a casing.

29. A device of the class described comprising means for supporting a bag and rigid means for folding a portion of the bag inwardly in the plane of the bag preparatory to the insertion of the bag in a tire casing.

30. A machine of the character described, comprising a plurality of shoes divided into two sets, one of said sets comprising a support for the inner periphery of the air bag, the other set being arranged about the outer periphery of the air bag, and means to move the last named set of shoes toward and from the center of the machine whereby the bag is collapsed between the shoes.

31. In a device of the class described, a support, a plurality of pins projecting from said support in parallel relation to each other, said pins arranged in spaced relation around the circumference of a circle to receive an annular tube therebetween, certain of said pins movable inwardly to position the same in spaced relation around the circumference of a smaller circle, a back plate mounted on said support, said back plate provided with openings through which said pins project and means to move said back plate longitudinally of said pins.

32. In a device of the class described, a support, a plurality of pins projecting from said support in parallel relation to each other, said pins arranged in spaced relation around the circumference of a circle to receive an annular tube therebetween, certain of said pins being movable to points in spaced relation around a smaller circle, means to move said pins and means operable to force a tube outwardly beyond the ends of said pins.

In witness whereof, I have hereunto signed my name.

ELOV F. MAAS.